United States Patent
Wang et al.

(10) Patent No.: US 12,009,509 B2
(45) Date of Patent: Jun. 11, 2024

(54) SOLVENTS AND CATALYST PREPARATIONS FOR LITHIUM-OXYGEN BATTERIES

(71) Applicant: UCHICAGO ARGONNE, LLC, Chicago, IL (US)

(72) Inventors: Hsien-Han Wang, Downers Grove, IL (US); Ritesh Jagatramka, Chicago, IL (US); Samuel Plunkett, Chicago, IL (US); Larry A. Curtiss, Downers Grove, IL (US); Khalil Amine, Oak Brook, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 0 days.

(21) Appl. No.: 18/101,663

(22) Filed: Jan. 26, 2023

(65) Prior Publication Data

US 2023/0170473 A1    Jun. 1, 2023

Related U.S. Application Data

(62) Division of application No. 16/941,249, filed on Jul. 28, 2020, now Pat. No. 11,658,291.

(51) Int. Cl.
| | | |
|---|---|---|
| *H01M 4/36* | (2006.01) | |
| *H01M 4/02* | (2006.01) | |
| *H01M 4/134* | (2010.01) | |
| *H01M 4/38* | (2006.01) | |
| *H01M 4/62* | (2006.01) | |
| *H01M 4/88* | (2006.01) | |
| *H01M 4/92* | (2006.01) | |
| *H01M 12/08* | (2006.01) | |

(52) U.S. Cl.
CPC ............ *H01M 4/366* (2013.01); *H01M 4/134* (2013.01); *H01M 4/382* (2013.01); *H01M 4/62* (2013.01); *H01M 4/885* (2013.01); *H01M 4/8882* (2013.01); *H01M 4/926* (2013.01); *H01M 12/08* (2013.01); *H01M 2004/027* (2013.01); *H01M 2004/028* (2013.01); *H01M 2300/0028* (2013.01); *H01M 2300/0037* (2013.01)

(58) Field of Classification Search
CPC ...... H01M 4/366; H01M 4/134; H01M 4/382; H01M 4/62; H01M 4/885; H01M 4/882; H01M 4/926; H01M 12/08
See application file for complete search history.

(56) References Cited

U.S. PATENT DOCUMENTS

| | | |
|---|---|---|
| 2018/0048025 A1 | 2/2018 | Jilek et al. |
| 2019/0097289 A1 | 3/2019 | Lee et al. |
| | (Continued) | |

OTHER PUBLICATIONS

Lu et al., A lithium-oxygen battery based on lithium superoxide, Jan. 21, 2016, Nature, 529, 377-383 (Year: 2016).*

(Continued)

*Primary Examiner* — Ula C Ruddock
*Assistant Examiner* — Armindo Carvalho, Jr.
(74) *Attorney, Agent, or Firm* — Foley & Lardner LLP

(57) ABSTRACT

An electrochemical device includes a lithium anode having a red poly(benzonitrile) coating covering at least a portion of the anode; a separator and an air cathode comprising reduced graphene oxide over gas diffusion layer; and an electrolyte comprising an ether solvent, benzonitrile, and a lithium salt.

3 Claims, 14 Drawing Sheets

(56) References Cited

U.S. PATENT DOCUMENTS

2019/0355996 A1 11/2019 Friesen et al.
2020/0119391 A1 4/2020 Ma et al.

OTHER PUBLICATIONS

Tanaka et al., Anode-active poly(benzonitrile-2,5-diyl) prepared by dehalogenation polycondensation, 1997, Synthetic Metals, 84, 425-426 (Year: 1997).*
Wang et al., Ultrafast optical Kerr effect of polybenzonitrile, 1997, Appl. Phys. B 64, 45-48 (Year: 1996).*
Lu, et al., "A lithium-oxygen battery based on lithium superoxide," Jan. 21, 2016, Nature, 529, pp. 377-383.
Notice of Allowance for U.S. Appl. No. 16/941,249, dated Jan. 19, 2023.
Tanaka, et al., Anode-active poly(benzonitrile-2,5-diyl) prepared by dehalogenation polycondensation, 1997, Synthetic Metals, 84, pp. 425-426.
Wang, et al., "Ultrafast optical Kerr effect of polybenzonitrile," 1997, Appl. Phys. B 64, pp. 45-48, (1996).

* cited by examiner

US 12,009,509 B2

SOLVENTS AND CATALYST PREPARATIONS FOR LITHIUM-OXYGEN BATTERIES

CROSS-REFERENCE TO RELATED APPLICATIONS

This application is a divisional of and claims priority to U.S. patent application Ser. No. 16/941,249, filed Jul. 28, 2020, the contents of which are incorporated herein by reference in its entirety.

GOVERNMENT RIGHTS

This invention was made with government support under Contract No. DE-AC02-06CH11357 awarded by the United States Department of Energy to UChicago Argonne, LLC, operator of Argonne National Laboratory. The government has certain rights in the invention.

FIELD

The present technology is generally related to lithium oxygen batteries, and is specifically related to those having a red polybenzonitrile coating on a lithium anode.

SUMMARY

In one aspect, a lithium-oxygen battery is provided that includes a lithium anode comprising a red poly(benzonitrile) coating covering at least a portion of the anode; an air cathode comprising reduced graphene oxide over gas diffusion layer (GDL); and an electrolyte comprising an ether solvent, benzonitrile, and a lithium salt. The batteries are configured to cycle at a current density from about 50 mA/g to about 1000 mA/g and a capacity of about 500 mAh/g to about 3000 mAh/g.

In another aspect, a method is provided for preparing a lithium-oxygen battery, the method including providing a lithium anode, an air cathode comprising reduced graphene oxide, and an electrolyte comprising an ether solvent, benzonitrile, and a lithium salt forming an electrochemical cell; and cycling the electrochemical cell to fount a coating of poly(benzonitrile) on at least a portion of the lithium anode.

In a further aspect, a method of forming an Ir catalyst on an air cathode is provided. The method includes heating a reduced graphene oxide impregnated with Ir(COD)(acac) in the presence of hydrogen to decompose the Ir(COD)(acac) and form Ir particles on the reduced graphene oxide to form the air cathode.

BRIEF DESCRIPTION OF THE DRAWINGS

FIG. 3 demonstrates that with use of LiIr$_3$ intermetallics served as a catalyst, initial charge potentials are lowered to around 3.7 V (vs Li/Li$^+$) to protect the electrolytes and enhance the cycle life.

FIG. 4 (first cycle black trace and gray out toward 75 cycles) demonstrates that with 1M LiTFSI in BN/TEGDME electrolyte and Li$_2$CO$_3$ coating, high current density (750 mA/g) and high capacity (750 mAh/g) discharge and charge have been accomplished for 75 cycles.

FIG. 5 demonstrates that with 1M LiTFSI in BN/TEGDME electrolyte and Li$_2$CO$_3$ coating, high current density (500 mA/g) and high capacity (500 mAh/g) have been accomplished for over 340 cycles.

DETAILED DESCRIPTION

Figure 1:
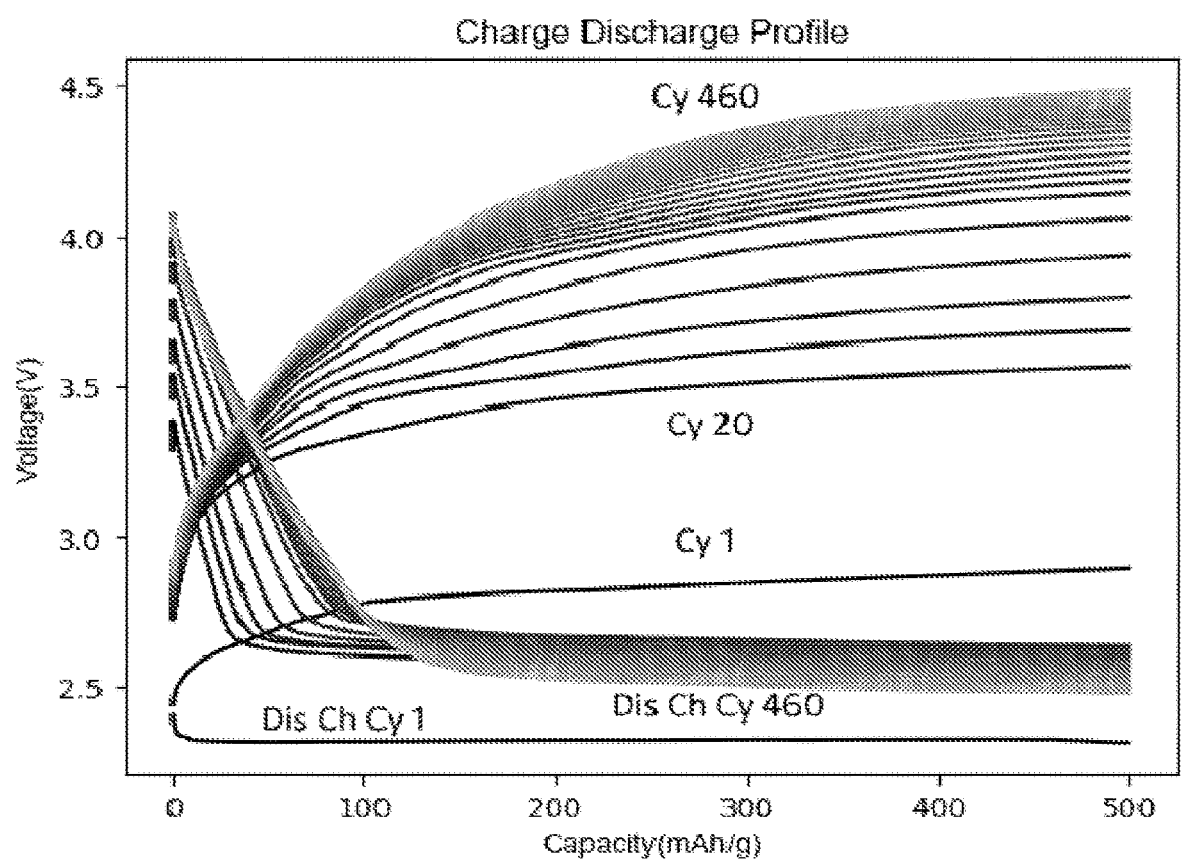
FIG. 1 is a graph of discharge/charge curves (Voltage vs Li/Li$^+$ (V) against Capacity mAh/g) of a lithium-oxygen cell under $O_2$ in benzonitrile (BN):tetraethyleneglycoldimethylether (TEGDMF) 20:80 vol %, 1 M LiTFSI (lithium bistrifluoromethanesulfonimidate, Li(CF$_3$SO$_2$)$_2$N) electrolyte, with a lithium metal coated with red poly(benzonitrile) (PBN) anode, a separator, and a reduced graphene oxide ("rGO") over carbon gas diffusion layer (GDL) air cathode, at a current density of 500 mA/g and a capacity of 500 mAh/g, electrochemically cycled for 450 cycles, according to the examples. This figure demonstrates the stable and long electrochemical cycle life of a Li—$O_2$ cell with use of BN:TEGDMF mixed solvents at a respectably high current density and high capacity.

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

The following abbreviation are used throughout:
BN: benzonitrile
DEGDME: diethyleneglycol dimethylether
EPR: electron paramagnetic resonance
GDL: gas diffusion layer
Ir(COD)(acac): iridium(cyclooctadiene)(acetylacetonate)
[Ir(COD)Cl]$_2$: iridium(cyclooctadiene)chloride dimer
LiO$_2$: lithium superoxide
Li$_2$O$_2$: lithium peroxide
LiTFSI: lithium bis(trifluoromethanesulfon)imidate
NMP: N-methyl-2-pyrrolidone
PBN: poly(benzonitrile)
PVDF: polyvinylidene difluoride
rGO: reduced graphene oxide
SEI: solid electrolyte interphase
TEGDME: tetraethyleneglycol dimethylether
TrEGDME: triethyleneglycol dimethylether Lithium-Oxygen batteries are very attractive due to their high theoretical energy density, which is estimated to be five times higher than that of the lithium-ion-batteries. See Girshkumar et al. *J. Phys. Chem. Lett.* 2010, 1, 2193-2203. Recently, lithium-oxygen batteries based on lithium superoxide (LiO$_2$) were described. See Lu et al., *Nature* 2016, 529, 377-383. The lithium superoxide system is based on Ir nanoparticles over reduced graphene oxide (rGO) to catalyze the reaction between the lithium and the oxygen. The main advantage is that the over-potential is significantly reduced and results in the increase of the Coulombic efficiency, however, the cycling behavior is not acceptable over long durations.

Here it has now been found that by incorporating a nitrile in the electrolyte of a lithium-oxygen battery, surprisingly good cycling results are obtained. For example, in a lithium oxygen battery having a lithium anode, an air cathode that includes reduced graphene oxide, and an electrolyte, a nitrile such as benzonitrile (BN) may be mixed into the electrolyte. Upon discharge of the battery, poly(benzonitrile) (PBN) is formed and deposited as a coating on the lithium anode. This coating enhances the cyclability of the battery (i.e. greater than 400 cycles are obtainable), cycle rate (current density between 50 mA/g up to 750 mA/g), and overall capacity (capacity times number of cycles). The lithium anode may further be coated with Li$_2$CO$_3$ to improve battery performance. The lithium carbonate may be generated by flushing the battery with CO$_2$ and cycling several times. The discharge products from the battery are lithium superoxide together with some amounts of lithium peroxide (Li$_2$O$_2$). Catalysts such as Ir, LiIr$_3$, etc., may be added to the air cathode to facilitate the formation of lithium superoxide. Besides BN that readily forms a PBN coating over a lithium anode, other nitriles such as acetonitrile, 2-phenylacetonitrile, propanenitrile, butanenitrile, and the like, may not form an effective polymeric coating but can be used as electrolyte additives.

BN (i.e. 1-cyanobenzene) has a large potential window from about 2.3 V to about 4.6 V and has a dielectric constant of about 8.93 at 25° C. BN polymerizes to form poly(benzonitrile) through reaction with lithium metal with the following equation:

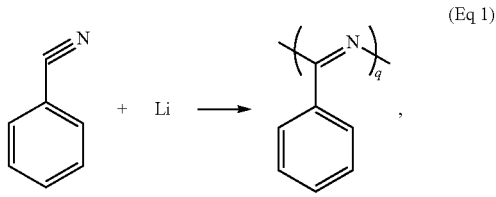

(Eq 1)

where q indicates repeating unit for the polymer. It has been found that when benzonitrile is exposed to lithium metal, a red poly(benzonitrile) material is generated. The red material is believed to contain radical anionic forms (Li$^+$PhCN$^-$, Li$^+$(PhCN)$_m^-$, etc.) ("m" merely indicates a polymer repeat unit together with neutral poly(benzonitrile) that is indicated by the EPR (Electron Paramagnetic Resonance spectroscopy) signals and the intense red color. Upon heating of the red PBN under Ar, there is a small increase of the associated EPR spin susceptibility between 300 and 350 K. Further heating shows an abrupt drop in the spin susceptibility between 350 and 400 K that is indicative of a phase transition and/or degradation. The transition at 350 K (77° C.) sets an upper limit and is acceptable for electrical vehicle (EV) battery application. Upon exposure to oxygen, the red PBN loses its color to form the white PBN and the associated EPR signal disappears. Again, without being bound by theory, it is believed that the red PBN forms a surface coating over lithium anode, where it serves as a protection layer. With mixed solvents such as BN/TEGDME, the red PBN forms a better conformal coating over lithium. Raman spectroscopic results show that as BN is polymerized, the C≡N peak of the monomer at 2229.4 cm$^{-1}$ disappears and a new peak forms at 1408 cm$^{-1}$, which is likely assignable to the C≡N bond. The Raman spectra of the red and white poly(benzonitrile) are essentially the same. Together with EPR evidence, it is believed that the red PBN is a living polymer that contains radical anionic forms while the white PBN is a terminated polymer.

As used herein, the term "air cathode," is used to indicate a cathode that includes oxygen either from a purified source, diluted with another gas (in many instances an inert gas in terms of the reaction conditions), or as an air mixture. The air cathode is prepared as follows: A carbon slurry is made with rGO, organic binder such as PVDF (polyvinylidene difluoride), and solvent NMP (N-Methyl-2-pyrrolidone) with and/or without catalysts (such as Ir nanoparticles, LiIr$_3$ nanoparticles, Rh nanoparticles, etc.). The carbon slurry is made homogeneous with use of a small ball mill equipment. The carbon slurry is then coated over a commercial gas diffusion layer (GDL) at various loading level. The air cathode is then dried and stored under inert gas.

The air cathode may also include a metal catalyst to assist in the oxygen reduction reaction. For example, deposition of finely dispersed iridium metal on the air cathode may be desirable in some embodiment. To prepare such catalyst, a starting iridium organometallic compound, such as, but not limited to, iridium(cyclooctadiene)(acetylacetonate) ("Ir (COD)(acac)"), may be applied to the reduced graphene oxide cathode where it is first dissolved in an organic solvent such as acetone and dried then reduced with a mixture of hydrogen and argon gases at about 100° C., upon cooling nanoscaled metallic Ir particles are generated. The particle size of the wet impregnated Jr may be tuned with the iridium precursor solution concentration. Cathodes prepared in this manner exhibit a two-step charge profile. The result suggests that lower over-potentials are readily achievable.

In one aspect, a lithium-oxygen battery is provided that includes a lithium anode having a red poly(benzonitrile) coating covering at least a portion of the anode. Typically, the anode surface facing the separator and the cathode is completely covered. In order to serve as an effective artificial SEI (solid electrolyte interphase) protective layer, the SEI layer must fulfill the following requirements: 1) As an electrode, the coating is desirable to have low electrical resistance while maintaining a high lithium cation permeability. 2) The coating is desirable to have strong mechanical stability and flexibility that adheres to the lithium anode. 3) During electrochemical discharge and charge processes, the coating is tolerant toward expansion and contraction. In addition, the coating should be compatible to electrolyte and other components in the cell. The red poly(benzonitrile) contains lithium cations (Li$^-$) and benzonitrile radical anions (PhCN$^-$) together with the poly(benzonitrile) backbone. It shows a Dysonian EPR lineshape that is due to the Eddy current induced by magnetic field only in a conductor. The EPR result indicates that the red poly(benzonitrile) is a conducting polymer. The Li$^+$PhCN$^-$ facilitates Li$^+$ permeability in the coating. The polymeric nature of the red poly(benzonitrile) provides sufficient flexibility and the C≡N double bonds increase the mechanical strength of the backbone. Besides the formation of red poly(benzonitrile) is spontaneous upon the contact between benzonitrile and lithium surface. Therefore, it is believed that the red poly (benzonitrile) is more tolerant toward expansion/contraction during discharge/charge processes. The red poly(benzonitrile) coating is on the order of a few microns that is thicker than the conventional SEI layer of a lithium ion battery. The lithium-oxygen battery also includes an air cathode that includes reduced graphene oxide. The lithium-oxygen battery also includes an electrolyte having an ether solvent, benzonitrile, and a lithium salt.

The electrolyte is based upon an ether solvent, however other solvents may be blended with the ether solvent as well. Illustrative ether solvents are those that are compatible with the lithium ion cell chemistry and which do not degrade, or only minimally degrade in the presence of the lithium metal anode. Illustrative examples, include, but are not limited to, those of formula $R(O(CR'_2)_n)_mOR$, where R is alkyl or cycloalkyl, R' is H or F, n is from 1 to 6, and m is from 1 to 10. In some embodiments, R is a $C_1$-$C_{10}$ alkyl. In some embodiments, n is 2 or 3. In some such embodiments, m is 2, 3, 4, 5, or 6. The R groups may be non-fluorinated or fluorinated. Other illustrative examples of ether solvents include, but are not limited to diethyleneglycoldimethylether (DEGDMF), triethyleneglycoldimethylether (TrEGDME), and tetraethyleneglycoldimethyl ether (TEGDME).

The electrolyte also contains a salt. Illustrative salts include, but are not limited to lithium alkyl fluorophosphates; lithium alkyl fluoroborates; lithium 4,5-dicyano-2-(trifluoromethyl)imidazole; lithium 4,5-dicyano-2-methylimidazole; trilithium 2,2',2"-tris(trifluoromethyl)benzotris (imidazolate); $LiN(CN)_2$; $LiCF_3SO_3$; $LiCH_3SO_3$; $LiN(SO_2CF_3)_2$; $LiN(SO_2F)_2$; $LiC(CF_3SO_2)_3$; $LiN(SO_2C_2F_5)_2$; $LiClO_4$; $LiBF_4$; $LiAsF_6$; $LiPF_6$; $LiBF_2(C_2O_4)$, $LiB(C_2O_4)_2$, $LiPF_2(C_2O_4)_2$, $LiPF_4(C_2O_4)$, $LiAsF_6$, CsF, $CsPF_6$, $LiN(SO_2F)_2$, $Li_2(B_{12}X_{12-p}H_p)$; $Li_2(B_{10}X_{10-p}^-H_p^-)$; or a mixture of any two or more thereof, wherein X may be independently at each occurrence a halogen, p may be 0, 1, 2, 3, 4, 5, 6, 7, 8, 9, 10, 11, or 12, and p' may be 0, 1, 2, 3, 4, 5, 6, 7, 8, 9, or 10. In some embodiments, the salt may be $LiPF_6$, $LiBF_4$, $LiN(SO_2CF_3)_2$, $Li(CF_3SO_3)$, or $LiN(SO_2F)_2$. The salt may be present in the electrolyte at any amount including from about 0.1 M to 3 M. This may include from about 1 M to about 2M.

The lithium anode for the lithium oxygen battery may also include a coating of $Li_2CO_3$. The $Li_2CO_3$ may be formed by exposing the lithium anode in an assembled cell to carbon dioxide through electrochemical cycling for a time period sufficient to form the coating (typically from 1 to 10 cycles). The battery is cycled in the presence of carbon dioxide to-form the coating, and then the carbon dioxide is flushed from the cell with oxygen, prior to sealing for use.

The benzonitrile in the electrolyte forms the coating of red poly(benzonitrile) on the surface of the anode during the initial discharge cycles of the battery. In some embodiments, the electrolyte includes about 15 vol % to about 50 vol % benzonitrile. This may include from about 10 vol % to about 50 vol %, or about 15 vol % to about 40 vol % benzonitrile.

Alternatively, the red poly(benzonitrile) coating on the anode may be conducted in a separate electrochemical cell to form a coated anode that is then used to construct the battery. In such embodiments, the electrolyte may not include the benzonitrile. In some embodiments where the red poly(benzonitrile) coated anode is formed separately, the electrolyte may include benzonitrile, acetonitrile, 2-phenyl acetonitrile, propanenitrile, and butanenitrile etc.

In some embodiments, the lithium anode may be the current collector for the anode, while in other embodiments, a current collector may also be included in the anode. Where the anode includes a separate current collector, it may be any of a wide variety of materials. For example, illustrative current collectors include, but are not limited to, copper, stainless steel, titanium, tantalum, platinum, palladium, gold, silver, iron, aluminum, nickel, rhodium, manganese, vanadium, titanium, tungsten, cobalt nickel alloy, highly alloyed ferritic stainless steel containing molybdenum and chromium; or nickel-, chromium-, or molybdenum-containing alloys, or a carbon-coated metal described above. The current collector may take the form of a foil, mesh, or screen.

The anode may also include a binder. When used, the binder may be present in an amount of from about 0.1 wt % to about 30 wt %. In some embodiments, the binder is present in the electrode in an amount of from about 5 wt % to about 20 wt %. Illustrative binders include, but are not limited to, polyvinylidene difluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CMC), gelatine, sodium alginate, polythiophene, polyacetylene, poly(9,9-dioctylfluorene-co-fluorenone), poly(9,9-dioctylfluorene-co-fluorenone-co-methylbenzoic ester), a copolymer of any two or more such polymers, and a blend of any two or more such polymers.

As noted above, the lithium-oxygen battery also includes an air cathode that includes reduced graphene oxide. The reduced graphene oxide may be prepared in advance of the assembly of the device, and may be commercially available. In some embodiments, a current collector may also be included in the cathode to effectively support electron transport to and from the cathode. The current collector may be any of a wide variety of materials. For example, illustrative current collectors include, but are not limited to, copper, stainless steel, titanium, tantalum, platinum, palladium, gold, silver, iron, aluminum, nickel, rhodium, manganese, vanadium, titanium, tungsten, cobalt nickel alloy, highly alloyed ferritic stainless steel containing molybdenum and chromium; or nickel-, chromium-, or molybdenum-containing alloys, or a carbon-coated metal described above. The current collector may take the form of a foil, mesh, or screen.

The air cathode may also include a binder. When used, the binder may be present in an amount of from about 0.1 wt % to about 30 wt %. In some embodiments, the binder is present in the electrode in an amount of from about 5 wt % to about 20 wt %. Illustrative binders include, but are not limited to, polyvinylidene fluoride (PVDF), polyvinyl alcohol (PVA), polyethylene, polystyrene, polyethylene oxide, polytetrafluoroethylene (Teflon), polyacrylonitrile, polyimide, styrene butadiene rubber (SBR), carboxy methyl cellulose (CIVIC), gelatine, sodium alginate, polythiophene, polyacetylene, poly(9,9-dioctylfluorene-co-fluorenone), poly(9,9-dioctylfluorene-co-fluorenone-co-methylbenzoic ester), a copolymer of any two or more such polymers, and a blend of any two or more such polymers.

The air cathode may also include particles of a metallic catalyst. For example, the air cathode may include micron-size or nano-sized particles of a metal such as Ir, Rh, Pt, Pd, $LiIr_3$, $LiRh_3$, Li/Pt, and Li/Pd intermetallics. In some embodiments, the air cathode includes particles of Ir. The particles of the metal catalyst may have a largest dimension from about 1 nm to about 10 microns. In some embodiments, the particles are from about 10 nm to about 1 micron, from about 10 nm to about 500 nm, from about 10 nm to about 100 nm, or from about 25 nm to about 200 nm.

The lithium oxygen batteries described herein exhibit high cycle rates and capacities. For example, the lithium oxygen battery may be configured to cycle at a rate of greater than 200 mA/g and a capacity of greater than 200 mAh/g. This may include, according to various embodiments, where the lithium oxygen battery is configured to cycle at a rate of about 200 mA/g to about 1000 mA/g and a capacity of about 200 mAh/g to about 3000 mAh/g. In some specific embodiments, the batteries are configured to cycle at a rate of about 500 mA/g and a capacity of about 500 mAh/g. We also note that over extended cycling (i.e. 450 cycles) the batteries are stable with respect to degradation.

The cell may include a Swagelok tube fitting to hold a lithium foil anode, a separator, and an air cathode over an aluminum mesh. The lithium anode may be further supported with a stainless steel (SS) rod and the air cathode/Al mesh may be supported with an Al ring to allow sufficient oxygen contact. The battery assembly is covered with Nylon bushing to avoid short and is housed in a glass jar that allows flushing with Ar, $O_2$, or $CO_2$. The Swagelok fitting may be replaced with a SS coin cell with the cathode side custom made with a grid finish to allow oxygen contact. Alternatively, the whole battery assembly can be made with a SS container for long lasting cycling.

In another aspect, a method of preparing a lithium-oxygen battery is provided. The method includes providing in a battery housing a lithium anode, an air cathode comprising reduced graphene oxide, and an electrolyte comprising an ether solvent, benzonitrile, and a lithium salt forming an electrochemical cell; and then cycling the electrochemical cell to form a coating of poly(benzonitrile) on at least a portion of the lithium anode. With the formation of the red poly(benzonitrile) coating on the anode, the electrolyte may be flushed from the battery and replaced with an electrolyte without the benzonitrile, or the battery may be used as formed and any residual benzonitrile remains in the electrolyte for the life of the battery where it may continue to form poly(benzonitrile).

In some embodiments, prior to cycling to form the red poly(benzonitrile) coating on the anode, the anode may be exposed to $CO_2$ and the anode cycled to deposit a coating of $Li_2CO_3$ on at least a portion of the lithium anode. The cycling in the presence of carbon dioxide is conducted for at least one, two, or three cycles.

In another aspect, a method of depositing a metal catalyst on an air cathode is provided. As noted above, a metal catalyst may be included on the air cathode, and a process for forming that may include providing a reduced graphene oxide with which a heat-degradable organometallic compound is mixed. The mixture is then heated to a decomposition temperature for the organometallic compound and metal particles are deposited on the reduced graphene oxide. In some embodiments, the organometallic compound is Ir(COD)(acac). Further, the heating of the mixture may be conducted in the presence of hydrogen to decompose the Ir(COD)(acac) and faun the Ir particles. Other catalyst precursors include but not limited to $IrCl_3 \cdot xH_2O$, $RhCl_3 \cdot xH_2O$, Rh(COD)(acac), $[Ir/Rh(COD)Cl]_2$, $PdCl_2$, $Pd(NO_3)_2$, and $PtCl_2$.

In such a process, the temperature at which the mixture is heated is greater than 80° C. This may include temperatures from about 80° C. to about 500° C., from about 80° C. to about 200° C., from about 80° C. to about 120° C., or about 100° C. Further, where hydrogen is used in conjunction with the heating of the mixture, the hydrogen may be provided as a pure stream or mixed with another inert gas such as nitrogen, helium, or argon.

The present invention, thus generally described, will be understood more readily by reference to the following examples, which are provided by way of illustration and are not intended to be limiting of the present invention.

EXAMPLES

Example 1. Swagelok fitting with glass jar cells were prepared to allow the cycling of the cell under different gases. The cells were prepared with an electrolyte of 20:80 vol % benzonitrile:TEGDME and 1 M LiTFSI. The cell also contained a lithium anode, a separator, and a reduced graphene oxide/carbon gas diffusion layer (GDL) air cathode. The cell was prepared inside of a glovebox under Ar. It was then flushed with oxygen for 20 minutes. A first cell was prepared as above and discharge/charge cycles (1 hour discharge and 1 hr charge for each cycle) at a current density of 500 mA/g and a capacity of 500 mAh/g were performed in oxygen. Cycles 1-451 were then measured and a graph of voltage vs Li/Li$^+$ (V) against capacity (mAh/g) is presented as FIG. 1. As shown in FIG. 1, the cells exhibit very good cycling stability with a high current density (~500 mA/g), the capacity begins to fade after about 450 cycles.

Figure 2A:
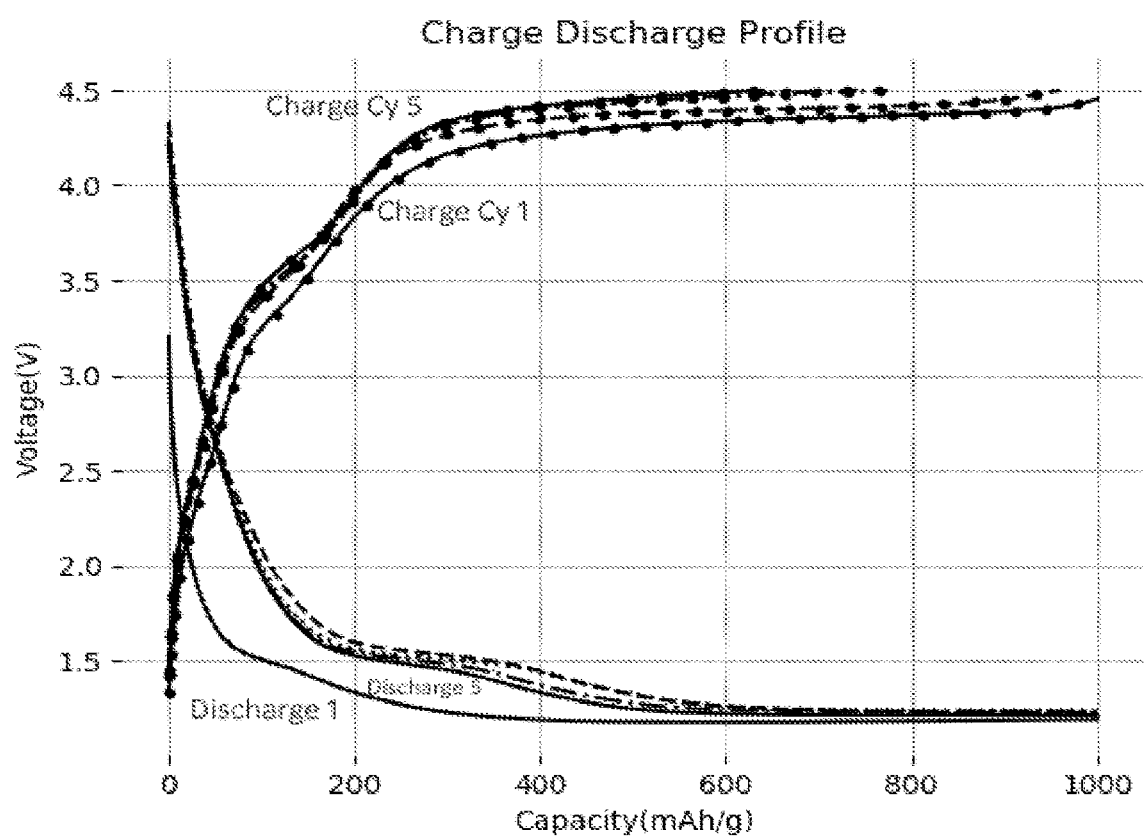
FIG. 2A is a graph of discharge/charge curves of a lithium-oxygen cell cycled under $CO_2$ in TEGDME, 1 M LiTFSI electrolyte, and a rGO/GDL air cathode at a current density of 100 mA/g and a capacity of 1000 mAh/g, electrochemically cycled for 5 cycles, according to the examples. This figure demonstrates that Li metal may be protected with a layer of Li$_2$CO$_3$ under 1M Li salt in TEGDME and $CO_2$ gas.
Figure 2B:
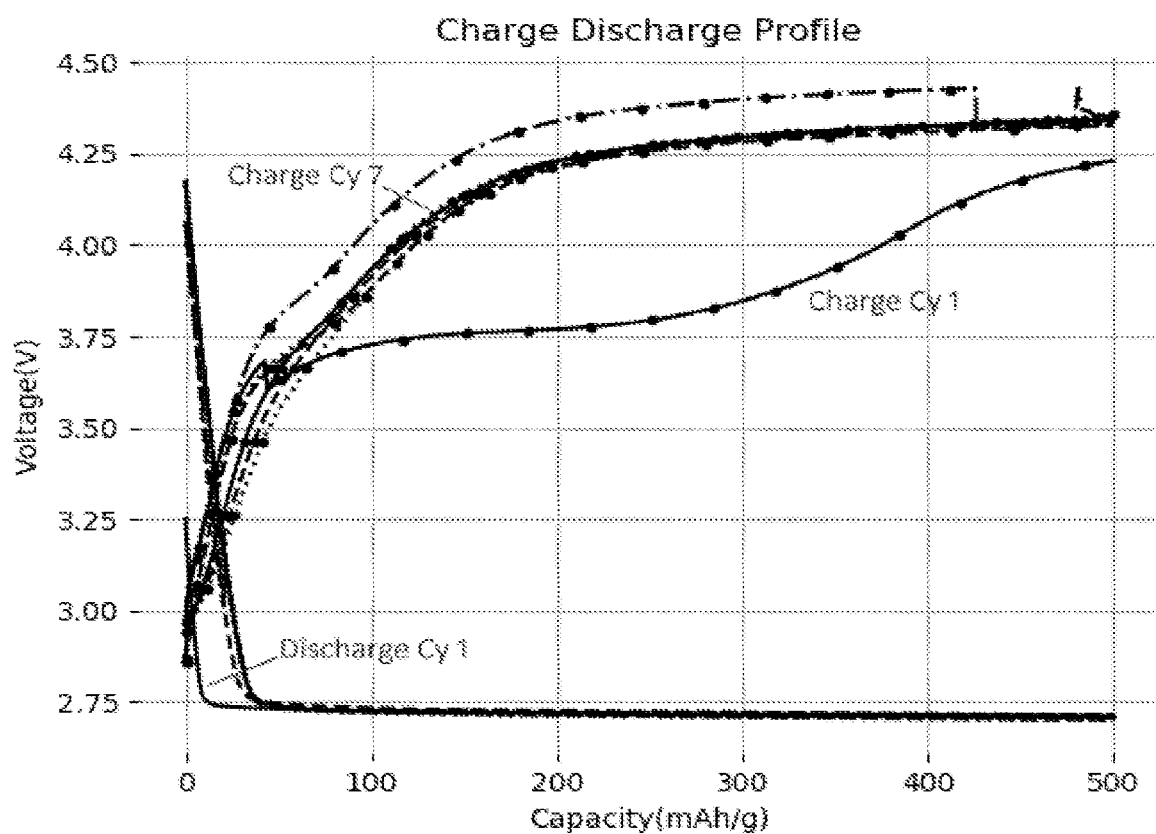
FIG. 2B is a graph of discharge/charge curves of a lithium-oxygen cell first cycled under $CO_2$ then under $O_2$ in TEGDMF, 1 M LiTFSI electrolyte, and a rGO/GDL air cathode at a current density of 100 mA/g and a capacity of 500 mAh/g, electrochemically cycled for 7 cycles, according to the examples.

Example 2. Swagelok fitting with glass jar cells were prepared in the same manner as Example 1. The cell contained a lithium anode, a separator, and an rGO/GDL air cathode. The electrolyte was 1M LiTFSI in TEGDME. After assembly inside of a glovebox under Ar, the cell was flushed with $CO_2$ for 20 minutes then cycled at a current density of 100 mA/g and a capacity of 1000 mAh/g for 5 cycles as FIG. 2A. Upon formation of a thin $Li_2CO_3$ coating, the cell was flushed with $O_2$ for 20 minutes then cycled at a current density of 100 mA/g and a capacity of 500 mAh/g for 7 cycles as FIG. 2B. The discharge product was primarily lithium peroxide ($Li_2O_2$).

Figure 3:
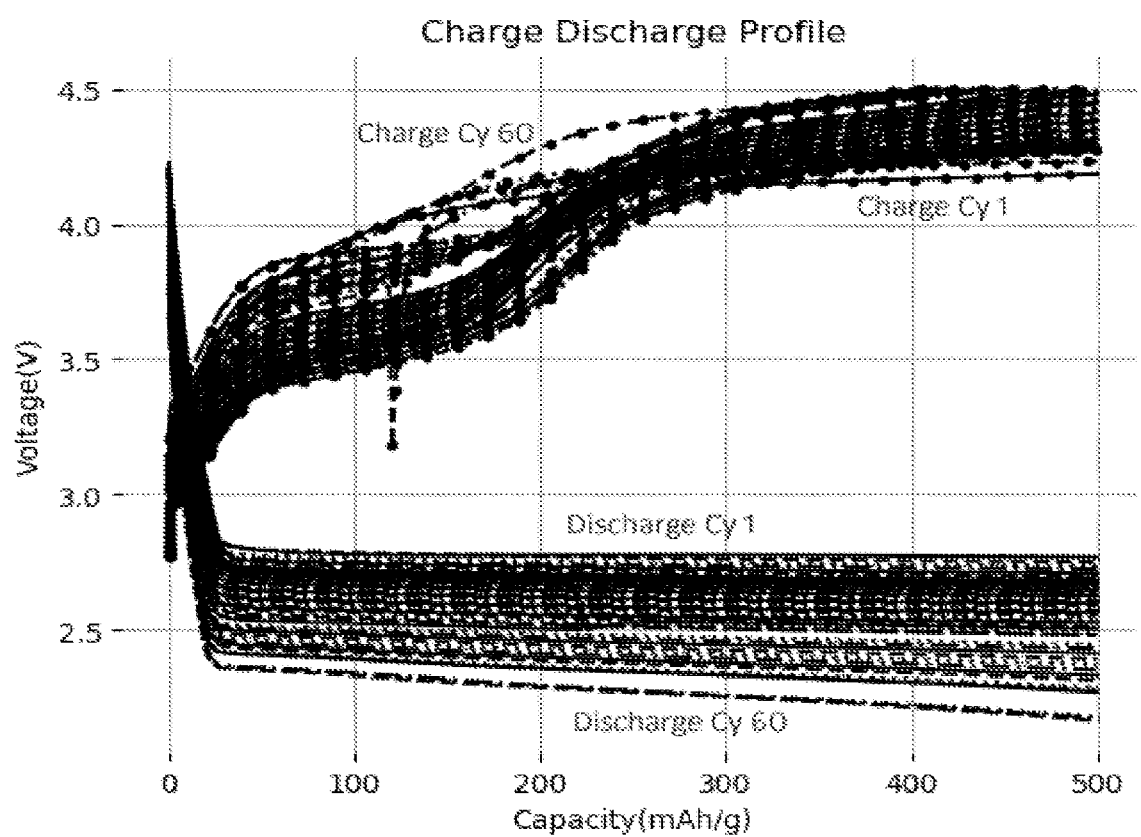
FIG. 3 is a graph of discharge/charge curves of a lithium-oxygen cell first cycled under $CO_2$ in 1M LiTFSI/TEGDME, with an rGO+LiIr$_3$ catalyst over GDL air cathode, at a current density of 50 mA/g and a capacity of 550 mAh/g for 3 cycles (not shown), then cycled under $O_2$ at a current density of 50 mA/g and a capacity of 500 mAh/g for 60 cycles, according to the examples.

Example 3. Cells were prepared with an electrolyte of 1 M LiTFSI and TEGDME. The cells also contained a lithium anode, a separator, and a reduced graphene oxide ("rGO") decorated with small amount of $LiIr_3$ catalyst powders over GDL air cathode and were cycled first in $CO_2$ at a rate of 50 mA/g and a capacity of 600 mAh/g (low rate, high capacity) for 3 cycles (not shown). After a thin layer of $Li_2CO_3$ was deposited over lithium anode, the cell was flushed with $O_2$ for 20 minutes. The cell was further cycled at a current density of 50 mA/g and a capacity of 500 mAh/g for 60 cycles FIG. 3. A distinct two-plateau charge profile at ~3.75 V and ~4.4-4.5 V (vs Li/Li$^+$) was indicative of mixed lithium superoxide ($LiO_2$) and lithium peroxide ($Li_2O_2$) discharge products. The catalyst $LiIr_3$ was made separately by mixing iridium powders (3 mole equivalents) with lithium foil (1.2 mole equivalent), packed in a tantalum (or niobium, molybdenum, tungsten) tube, further sealed in a quartz tube under vacuum and heated at 800° C. for 8 days.

Figure 4:
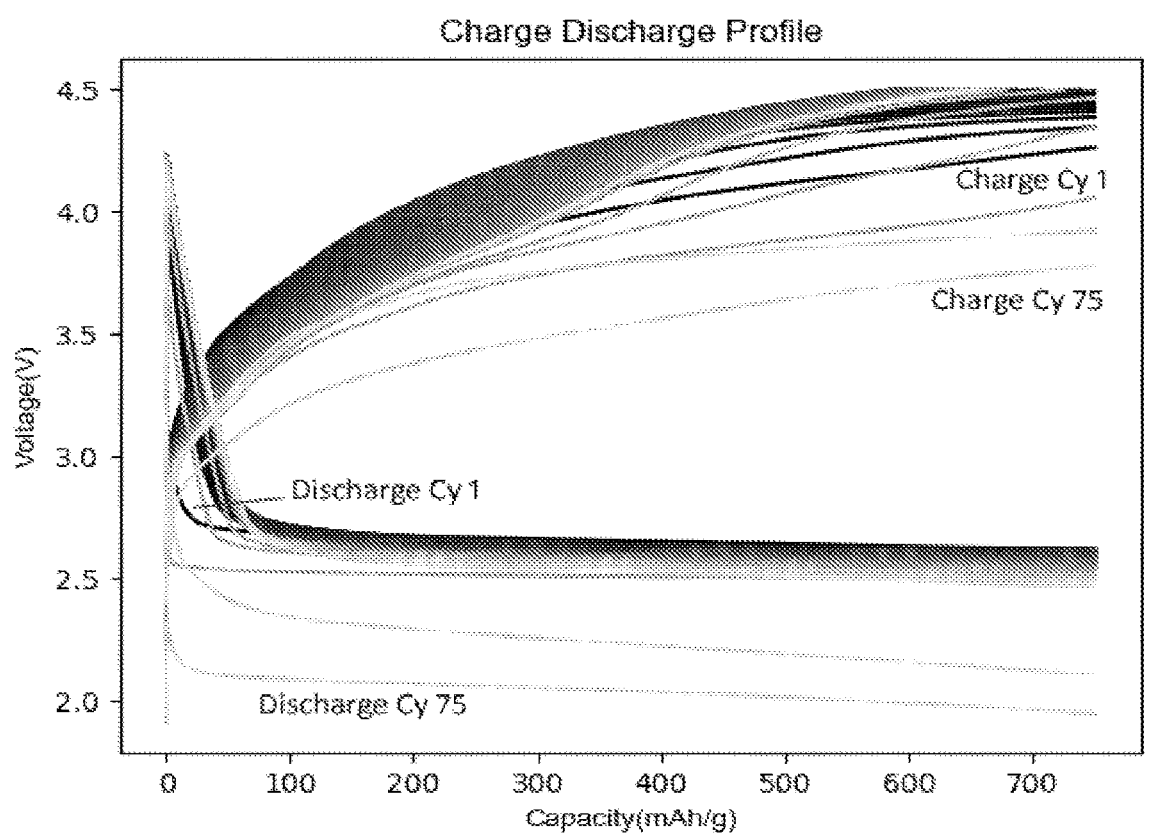
FIG. 4 is a graph of discharge/charge curves of a lithium-oxygen cell first cycled under $CO_2$ in a mixture of 1:1 (volume basis) benzonitrile:TEGDMF, 1M LiTFSI with a rGO/GDL cathode, at a current density of 750 mA/g and a capacity of 750 mAh/g for 3 cycles (not shown), then under $O_2$ with the same current density and capacity for 75 cycles, according to the examples.

Example 4. Swagelok cells having a lithium anode, separator, and rGO/GDL air cathode was prepared. The cell was first cycled under $CO_2$ in a mixture of 50:50 (vol %) BN:TEGDME, 1M LiTFSI, at a current density of 750 mA/g and a capacity of 750 mAh/g for 3 cycles (not shown), then under $O_2$ with the same current density and capacity for 75 cycles FIG. 4.

Figure 5:
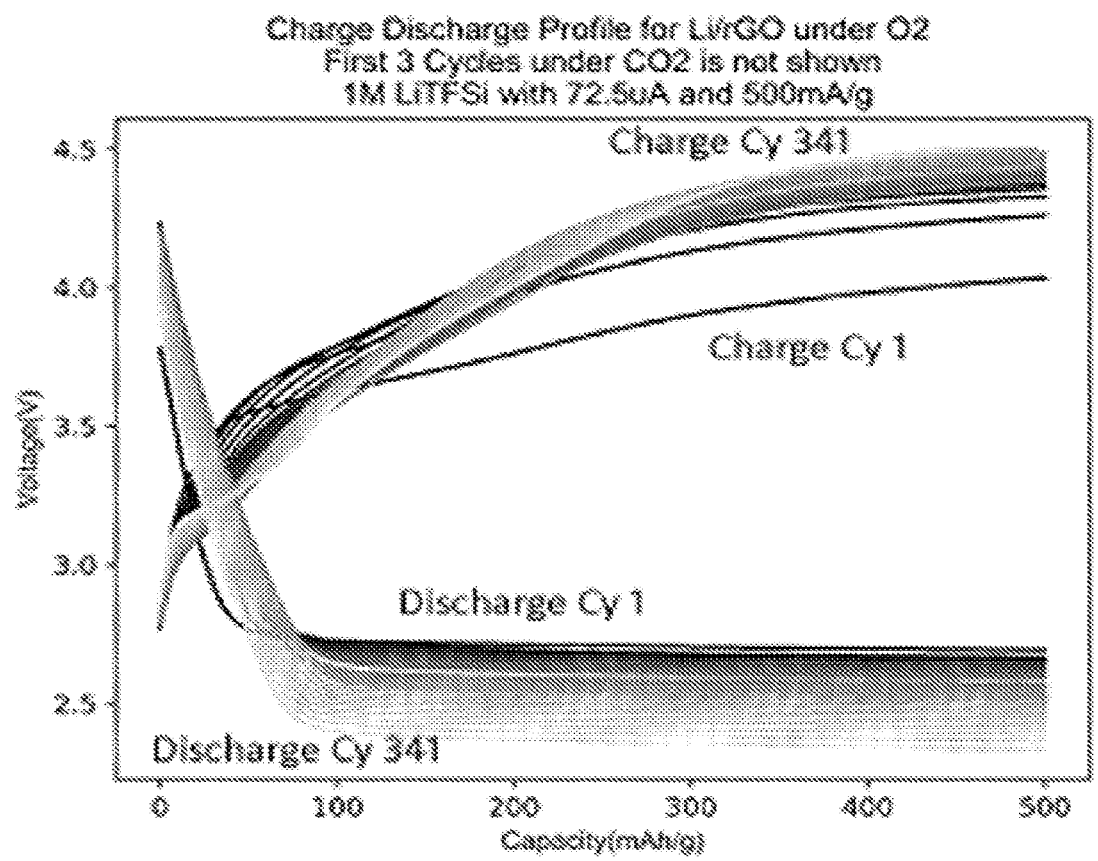
FIG. 5 is a graph of discharge/charge curves of a lithium-oxygen cell first cycled under $CO_2$ in a mixture of 40:60 (volume basis) BN:TEGDME, 1M LiTFSI with a rGO/GDL cathode for 3 cycles (not shown), then under $O_2$, cycles 1 to 341, at a current density 500 mA/g and at a capacity of 500 mAh/g, according to the examples.

Example 5. A Swagelok cell having a lithium anode, separator, and rGO/GDL air cathode was prepared. The cell was first cycled under $CO_2$ in a mixture of 40:60 (vol %) BN:TEGDME, 1M LiTFSI for 3 cycles (not shown) to build a $Li_2CO_3$ coating. It was flushed with oxygen then cycled under $O_2$, cycles 1 to 341, at a current density 500 mA/g and at a capacity of 500 mAh/g FIG. 5.

Figure 6:
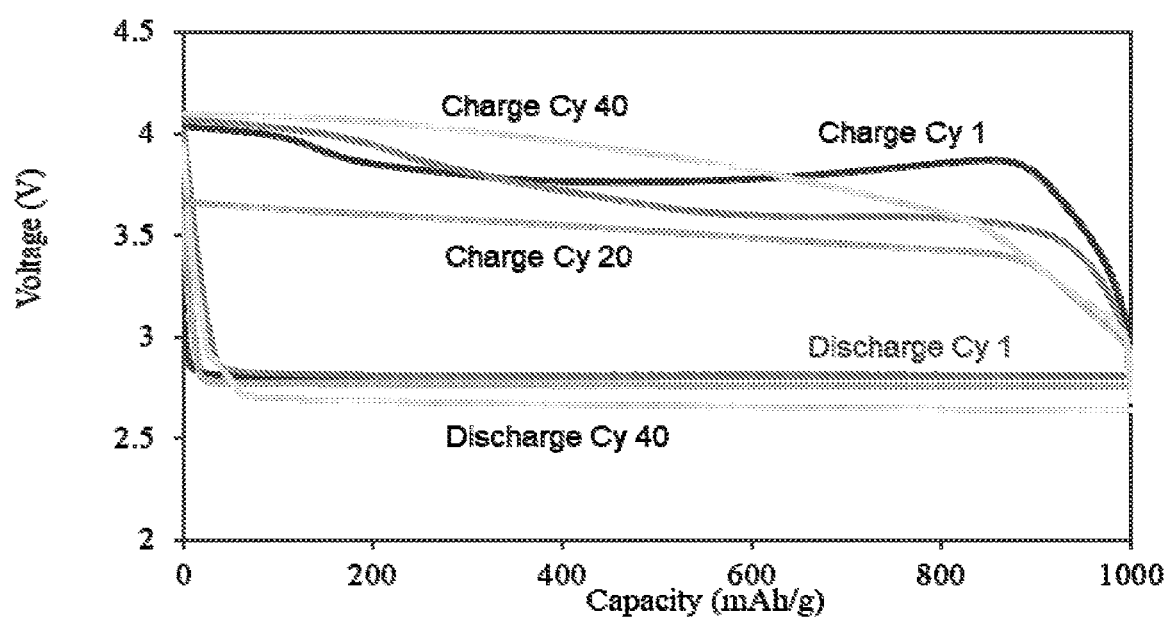
FIG. 6 is a graph of discharge/charge curves of a lithium-oxygen cell under $O_2$ in 1 M Li triflate/TEGDME electrolyte, and a rGO/GDL air cathode at a current density of 100 mA/g and a capacity of 1000 mAh/g, electrochemically cycled for 40 cycles, according to the examples.
Figure 7:
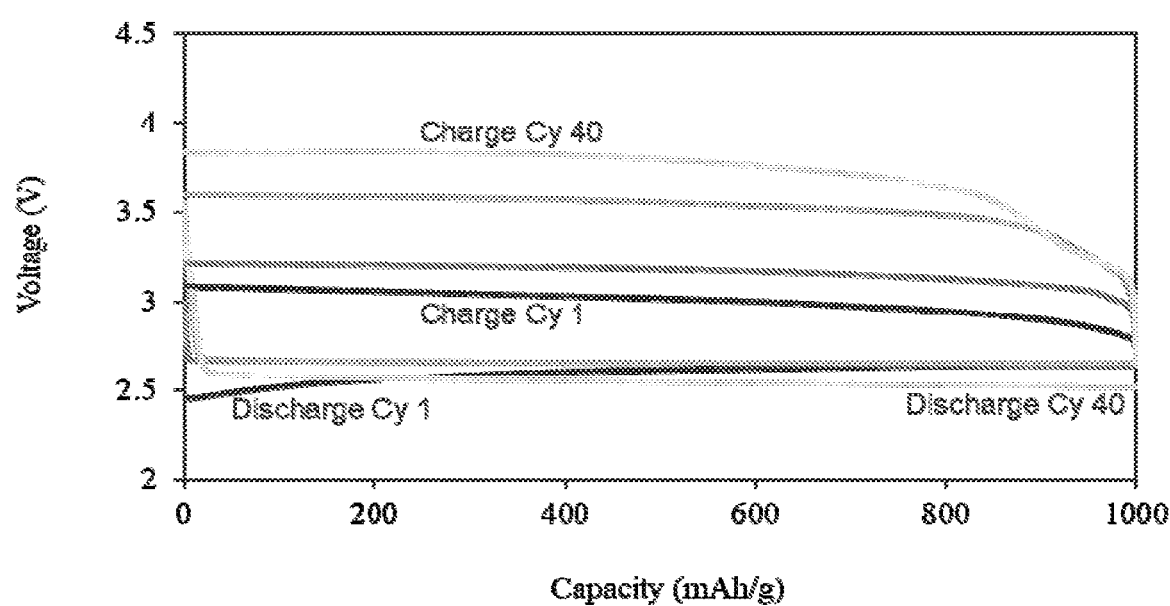
FIG. 7 is a graph of discharge/charge curves of a lithium-oxygen cell under $O_2$ in 1 M Li triflate/BN: TEGDME 20:80 vol % electrolyte, and a rGO/GDL air cathode at a current density of 100 mA/g and a capacity of 1000 mAh/g, electrochemically cycled for 40 cycles, showing BN additive reduces the charge over-potential during the initial 40 cycles, according to the examples.

Example 6. Swagelok cells. The cells were prepared with an electrolyte of 100% TEGDME (FIG. 6) and 20:80 (vol %) BN:TEGDME (FIG. 7) and 1 M LiTFSI. The cells each contained a lithium anode, a separator, and a rGO/GDL cathode and were cycled at a rate of 100 mA/g and a capacity of 1000 mAh/g (low rate, high capacity). The benzonitrile at low levels (~20 vol %) was found to reduce the charge overpotential of the cell during the initial cycles (i.e. cycles 1-40).

Figure 8:
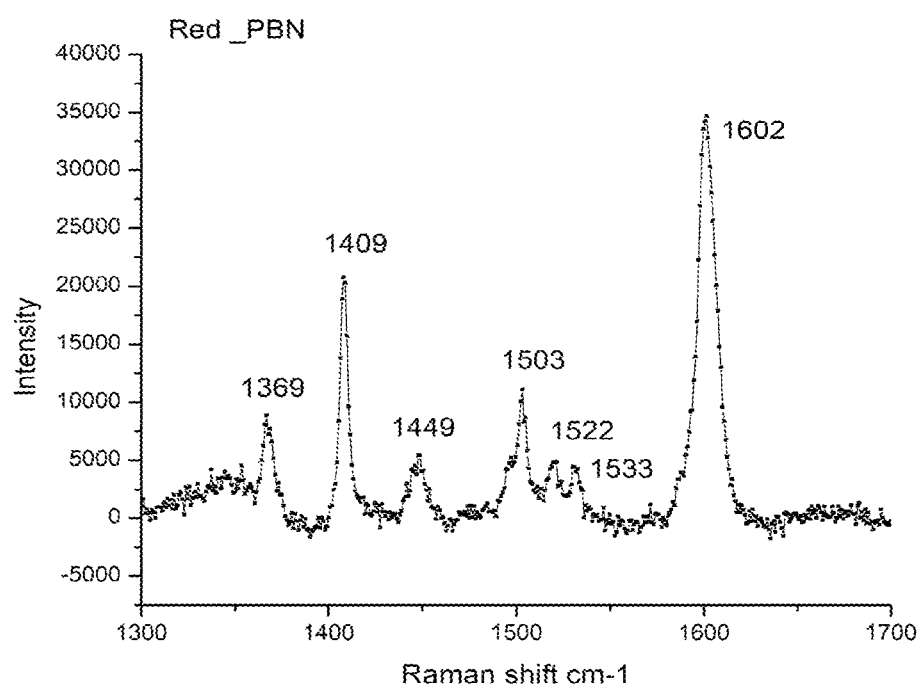
FIG. 8 is a Raman spectra of red poly(benzonitrile) recorded using an Ar filled cell, according to the examples.
Figure 9:
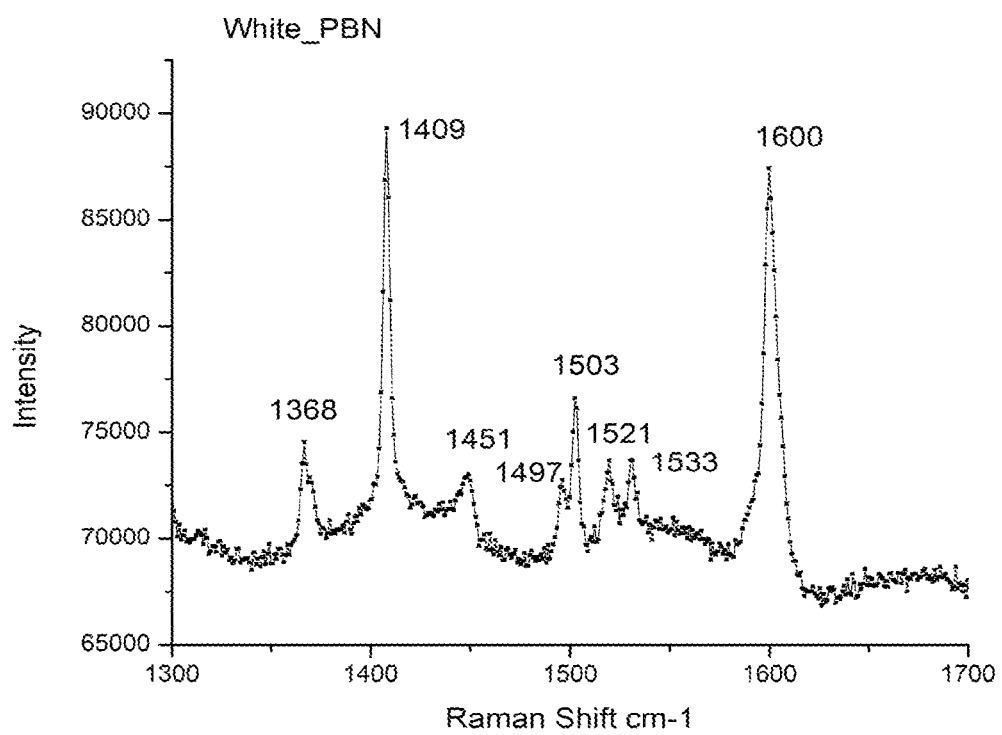
FIG. 9 is a Raman spectra of white poly(benzonitrile) recorded under ambient condition, according to the examples.
Figure 10:
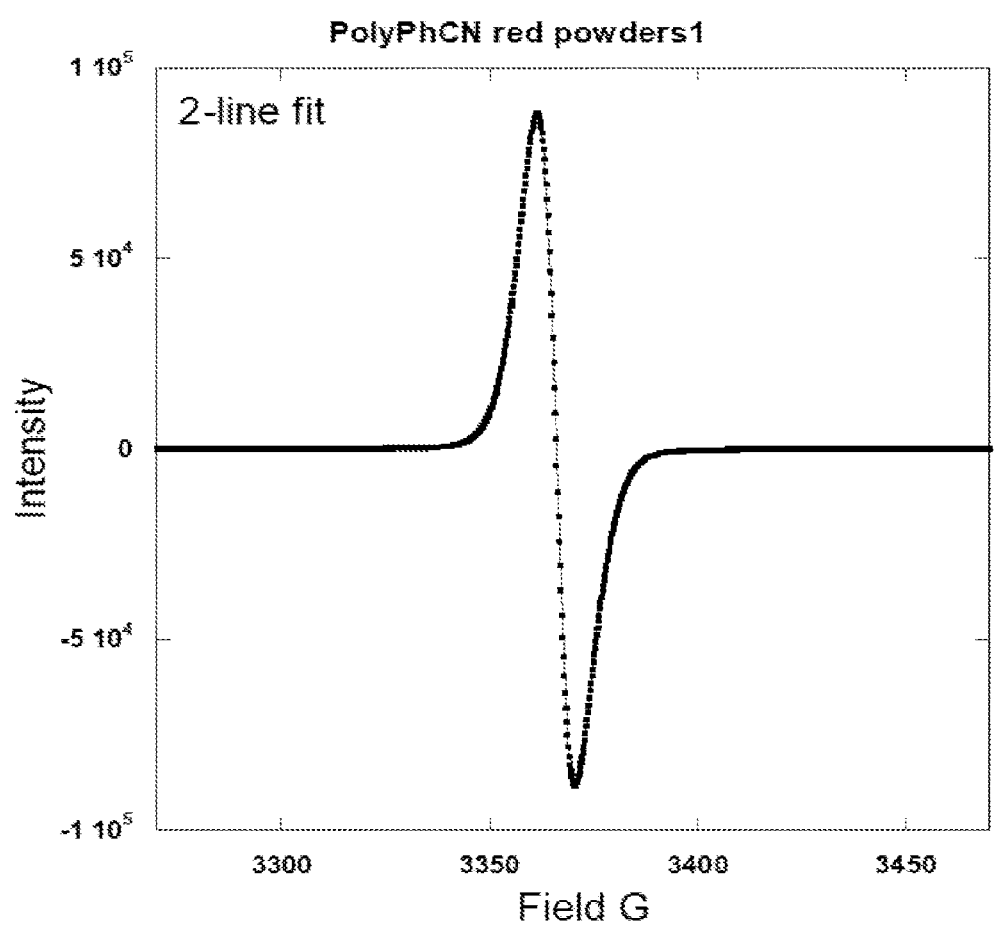
FIG. 10 is an electron paramagnetic resonance (EPR) spectrum for red poly(benzonitrile) taken under Ar, according to the examples.
Figure 11:
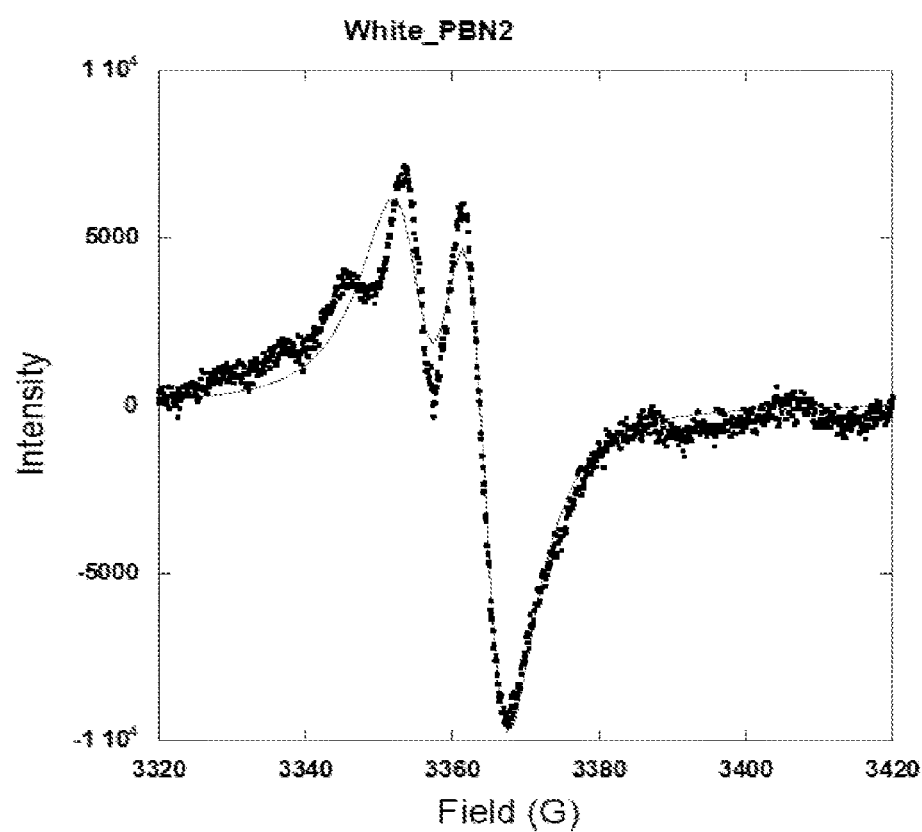
FIG. 11 is an EPR spectrum for white poly(benzonitrile) taken under ambient condition, according to the examples.
Figure 12:
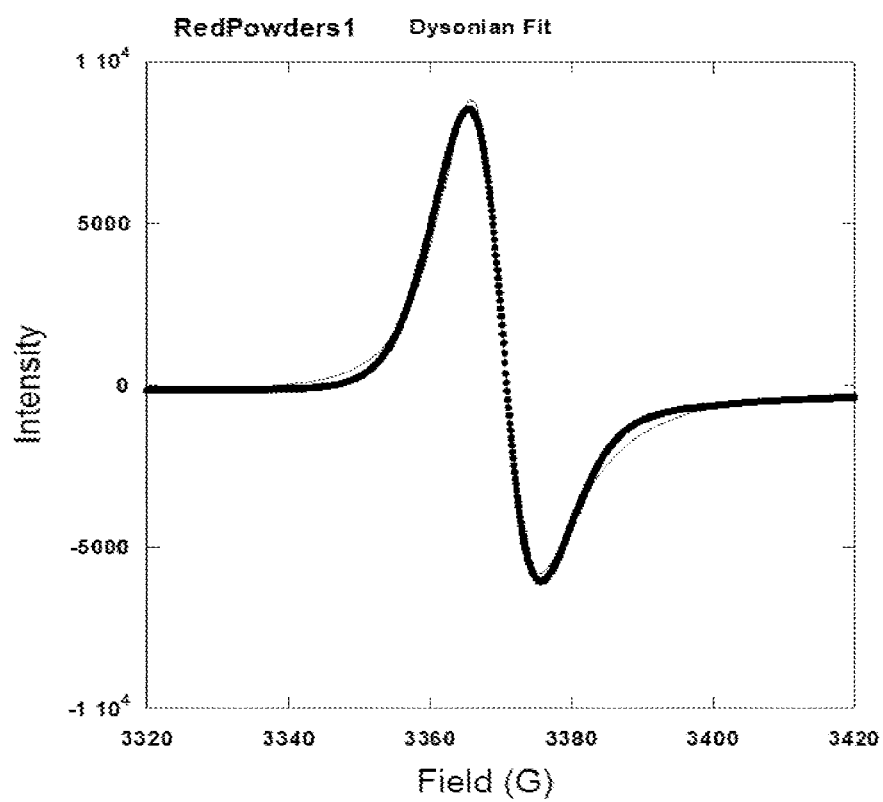
FIG. 12 is an EPR spectrum of a platelet shaped red poly(benzonitrile) sample showing a Dysonian line shape of a conductor.
Figure 13:
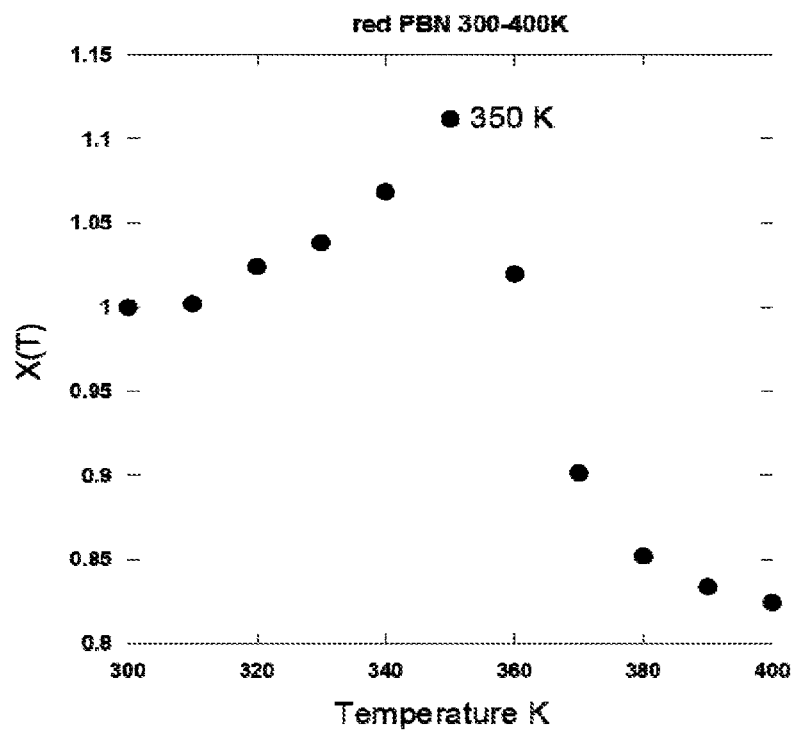
FIG. 13 is the EPR spin susceptibility behavior of red PBN powders between 300 and 400 K showing a phase transition around 350 K.

Example 7. Raman and EPR testing of the red poly (benzonitrile) were carried out under an Ar environment. Raman spectra of red and white poly(benzonitrile) are show in FIGS. 8 and 9. These figures show that the red and white PBN are virtually identical in structure given the near identical Raman spectra. However, EPR measurements show the red poly(benzonitrile) to be EPR active (FIG. 10), whereas the white poly(benzonitrile) at a comparable amount gave residual EPR signals less than 10% of the intensity of the red PBN (FIG. 11). Based on the Raman and EPR evidences, the red PBN is a living polymer while the white PBN is a terminated one. In addition, when a platelet shaped red PBN is measured horizontally in an EPR cavity, a Dysonian lineshape is observed FIG. 12. The Dysonian lineshape due to Eddy current induced by a strong magnetic field of a conductor indicates that the red PBN is indeed conductive. In view of the EPR active red poly(benzonitrile), it is believed that in the cells, where is formed to coat the lithium anode, unpaired electrons are able to move along the poly(benzonitrile) backbone and possibly hop from one chain to another. Upon heating of the red PBN under Ar, there is a small increase of the associated EPR spin susceptibility between 300 and 350 K. Further heating shows an abrupt drop in the spin susceptibility between 350 and 400 K that is indicative of a phase transition and/or degradation FIG. 13. The transition at 350 K (77° C.) sets an upper limit and is acceptable for electrical vehicle (EV) battery application.

Figure 14:
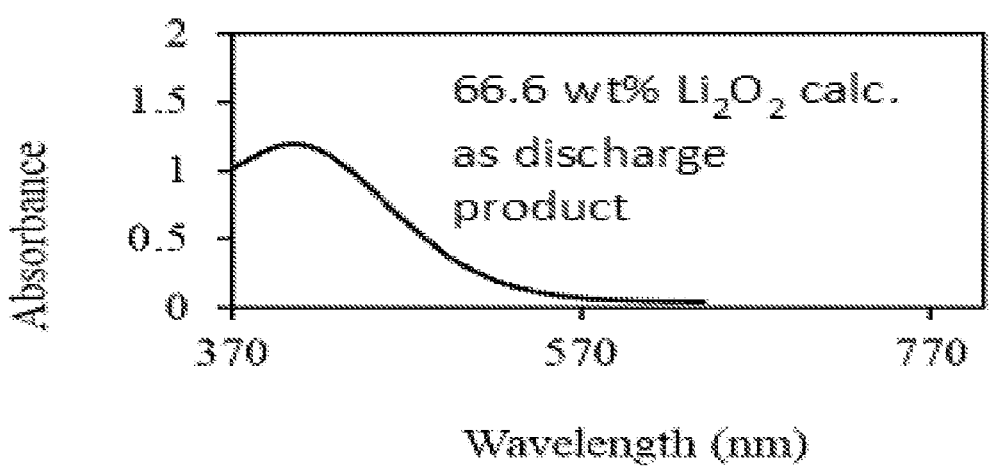
FIG. 14 is a UV-VIS spectrum illustrating $Li_2O_2$ formation upon discharge, according to the examples.

Example 8. Discharge product determination. The cells were prepared with an electrolyte of 2:98 (vol %) BN: TEGDME and 1 M lithium trifluoromethansulfonate. The cells also contained a lithium anode, a separator, and a reduced graphene oxide ("rGO") over GDL air cathode and were cycled under $O_2$ at a rate of 100 mA/g and a capacity of 1000 mAh/g (low rate, high capacity). After 1.5 cycles (i.e. one full cycle to validate the cell condition then stopped after one more discharge half-cycle), the Raman and titration tests were conducted. At this stage, no $LiO_2$ was observed by Raman (this is well known in the literature due to low concentrations on the cathode). The titration with use of the Ti(IV)OSO$_4$ reagent is a quantitative determination specifically for lithium peroxide. Based on chemical specific reaction, a new UV-Vis peak appears at 410 nm is calibrated against concentration standard. The titration showed that $Li_2O_2$ is the major discharge product (see FIG. 14).

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A method of preparing a lithium-oxygen battery, the method comprising:
   providing a lithium anode, an air cathode comprising reduced graphene oxide, and an electrolyte comprising an ether solvent, benzonitrile, and a lithium salt forming an electrochemical cell; and
   cycling the electrochemical cell to form a coating of red poly(benzonitrile) on at least a portion of the lithium anode.

2. The method of claim 1 further comprising prior to cycling, exposing the electrochemical cell to $CO_2$ and cycling the cell to deposit a coating of $Li_2CO_3$ on at least a portion of the lithium anode.

3. The method of claim 2, where in the cycling in the presence of $CO_2$ is conducted for at least three cycles.

* * * * *